United States Patent [19]

Sasaki et al.

[11] Patent Number: 5,132,269
[45] Date of Patent: Jul. 21, 1992

[54] IRON-ANTIMONY-MOLYBDENUM-CONTAINING OXIDE CATALYST COMPOSITION AND PROCESS FOR PREPARING THE SAME

[75] Inventors: Yutaka Sasaki; Hiroshi Yamamoto; Koichi Mizutani; Kiyoshi Moriya; Kunio Mori, all of Kanagawa, Japan

[73] Assignee: Nitto Chemical Industry Co., Ltd., Tokyo, Japan

[21] Appl. No.: 756,708

[22] Filed: Sep. 9, 1991

[30] Foreign Application Priority Data

Sep. 10, 1990 [JP] Japan .................. 2-237002

[51] Int. Cl.$^5$ .................. B01J 23/78; B01J 23/84; B01J 23/88; B01J 27/057
[52] U.S. Cl. .................. 502/205; 502/212; 502/215; 502/302; 502/303; 502/304; 502/306; 502/307; 502/308; 502/309; 502/310; 502/311; 558/322; 558/323; 558/324
[58] Field of Search .............. 502/205, 212, 215, 302, 502/303, 304, 306, 307, 308, 309, 310, 311; 558/332, 323, 324

[56] References Cited

U.S. PATENT DOCUMENTS

| | | | |
|---|---|---|---|
| 3,988,359 | 10/1976 | Saito et al. | 502/212 X |
| 4,018,712 | 4/1977 | Li | 252/456 |
| 4,111,984 | 12/1981 | Ishii et al. | 562/538 |
| 4,290,920 | 9/1981 | Suresh et al. | 502/306 X |
| 4,306,090 | 12/1981 | Kirch et al. | 568/481 |
| 4,981,830 | 1/1991 | Sasaki et al. | 502/212 X |

FOREIGN PATENT DOCUMENTS

0267556 5/1988 European Pat. Off. .
0340909 11/1989 European Pat. Off. .
0383598 8/1990 European Pat. Off. .

Primary Examiner—W. J. Shine
Attorney, Agent, or Firm—Sughrue, Mion, Zinn, Macpeak & Seas

[57] ABSTRACT

An iron-antimony-molybdenum-containing oxide catalyst composition for oxidation reactions, comprising a crystalline iron antimonate having a crystallite size of 100 Å or more, said catalyst being represented by the following empirical formula:

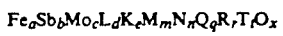

$$Fe_aSb_bMo_cL_dK_eM_mN_nQ_qR_rT_tO_x$$

wherein L represents at least one element selected from the group consisting of Bi and Te; M represents at least one element selected from the group consisting of Cu, Mg, Zn, La, Ce, Al, Cr, Mn, Co, Ni and Sn; N represents at least one element selected from the group consisting of Be, Ca, Sr, Ba, Y, Pr, Nd, Th, U, Ti, Zr, Hf, Nb, Ta, Re, Ru, Os, Rh, Ir, Pd, Pt, Ag, Au, Cd, Al, Ga, In, Ge and Pb; Q represents at least one element selected from the group consisting of V and W; R represents at least one element selected from the group consisting of Li, Na, Rb, Cs, and Tl; T represents at least one element selected from the group consisting of B, P, As and Se; a, b, c, d, e, m, n, q, r, t and x each is an atomic ratio, wherein when a is 10, b is 5 to 60, c is 5 to 30, d is 0.01 to 10, e is 0.01 to 5, m is 0 to 30, n is 0 to 10, q is 0 to 5, r is 0 to 3, t is 0 to 5, and x is a number of oxygen atoms as determined corresponding to the oxides formed by combining the above mentioned components.

12 Claims, No Drawings

IRON-ANTIMONY-MOLYBDENUM-CONTAINING OXIDE CATALYST COMPOSITION AND PROCESS FOR PREPARING THE SAME

FIELD OF THE INVENTION

The present invention relates to an iron-antimony-molybdenum-containing oxide catalyst composition having physical properties as well as an activity suitable for use in carrying out reactions such as the oxidation reactions, ammoxidation reactions and oxidative dehydrogenation reactions of organic compounds. It also relates to a process for preparing the same.

BACKGROUND OF THE INVENTION

Many catalysts have been proposed as catalysts for use in the oxidation reactions, ammoxidation reactions and oxidative dehydrogenation reactions of organic compounds. For example, catalysts containing molybdenum and bismuth are disclosed in JP-B-36-3563 (the term "JP-B" as used herein refers to an "examined Japanese patent publication") (corresponding to U.S. Pat. No. 2,941,007), JP-B-36-5870 (U.S. Pat. No. 2,904,580), JP-B-38-17967 (U.S. Pat. No. 3,226,422), JP-B-47-27490 (U.S. Pat. No. 3,959,384), JP-B-48-43096 (U.S. Pat. No. 3,766,092), JP-B-51-33888 (U.S. Pat. No. 4,503,001), JP-B-53-23813 (U.S. Pat. No. 3,894,091), JP-A-55-13187 (the term "JP-A" as used herein refers to a "published unexamined Japanese patent application") (corresponding to U.S. Pat. No. 4,212,760) and JP-B-60-36812 (U.S. Pat. Nos. 4,377,534 and 4,600,541). Catalysts containing molybdenum and tellurium are disclosed in JP-B-37-11008 (U.S. Pat. No. 3,164,626) and JP-B-39-8214 (British Patent 1,016,031). Catalysts containing antimony and tin are disclosed in JP-B-37-14075 (U.S. Pat. No. 3,269,957) and JP-B-47-40958. Catalysts containing antimony and uranium are disclosed in JP-B-40-24367 (U.S. Pat. No. 3,308,151) and JP-B-47-19764. JP-A-56-97550 (corresponding to European Patent 32,618B) proposes catalysts containing a metal antimonate component and a bismuth molybdate component.

Further, catalysts containing antimony and iron as essential elements are disclosed in JP-B-38-19111. Many improvements on these catalysts have been made. For example, JP-B-45-32685 (U.S. Pat. No. 3,542,843), JP-B-46-2804 (U.S. Pat. No. 3,668,147), JP-B-46-2805 (U.S. Pat. No. 3,591,620), JP-B-46-2806, JP-B-46-2807, JP-B-46-3564, JP-B-47-19765 (U.S. Pat. No. 3,716,496), JP-B-47-19766, JP-B-47-19767, JP-B-53-18014 (U.S. Pat. Nos. 3,988,359 and 4,083,804) and JP-B-57-26592 (U.S. Pat. No. 4,370,279) propose catalysts to improve prior arts.

In addition, JP-A-57-114560, JP-A-60-90044, JP-B-62-46538 (U.S. Pat. No. 4,309,361) and JP-A-3-26342 (U.S. patent application Ser. No. 07/540,729, filed on Jun. 20, 1990, now U.S. Pat. No. 5,094,990, and European Patent Publication 404,529A1) propose catalysts containing antimony and iron.

On the other hand, processes for preparing these catalysts are disclosed in, for example, JP-B-42-22476 (U.S. Pat. No. 3,341,971), JP-B-47-18722 (U.S. Pat. No. 3,657,155), JP-B-47-18723 (U.S. Pat. No. 3,686,138) and JP-B-52-42552 (U.S. Pat. No. 4,049,575).

Since the industrial output of products is high in the field of the production of particularly acrylonitrile, acrolein and methacrylonitrile to which the present invention belongs, a slight increase by 1% in the yields of the desired products or a slight improvement in the physical properties of the catalyst such as catalyst strength gives remarkable commercial and economic effects. Accordingly, it is an important matter that an improvement in the performance of the catalysts to be used for the above described reactions is made.

Conventional catalysts have many disadvantages in that the yields of the desired products are insufficient, a change with time is great, reproducibility is poor, and the catalysts do not always satisfy both activity and physical properties. Among the above described conventional catalysts, catalysts containing iron and antimony described in JP-B-53-18014 (U.S. Pat. Nos. 3,988,359 and 4,083,804) and JP-A-3-26342 (U.S. patent application Ser. No. 07/540,729 and European Patent Publication 404,529A1) are excellent ones and have many advantages. However, when these catalysts contain a relatively large amount of a molybdenum component as in the former, there is a problem that the yield of the desired product acrylonitrile is lowered as described, for example, in the experimental examples (catalysts 17 and 18 and catalyst 22) of the former reference. Further, when these catalysts contain a relatively large amount of a phosphorus component as in the latter, there is a problem that the yield of the product obtained by the ammoxidation of olefinic hydrocarbons is lowered as described, for example, in the experimental examples (Examples 7 and 8) of the latter reference.

The present invention has been performed to improve the activity and physical properties of an iron-antimony-containing catalyst having a relatively high molybdenum content.

SUMMARY OF THE INVENTION

An object of the present invention is to provide an iron-antimony-molybdenum-containing oxide catalyst composition suitable for use in the vapor phase catalytic oxidation reactions (including normal oxidation reactions, oxidative dehydrogenation reactions and ammoxidation reactions) of organic compounds, which is excellent in catalyst activity as well as in physical properties.

Another object of the present invention is to provide a method for making an iron-antimony-molybdenum-containing oxide catalyst composition with easy operation, which can be produced with good reproducibility.

It is conventionally considered that the presence of an alkali component in the iron-antimony-molybdenum-containing catalyst systems is not preferred as described in JP-B-57-26592. However, it has now been found that when the catalysts contain a relatively large amount of molybdenum component, the presence of an alkali metal element, particularly potassium surprisingly gives a favorable effect on catalyst performance rather than an unfavorable effect, the yields of the desired products are improved and catalysts having good activity as well as good physical properties can be obtained. The present invention has been accomplished on the basis of this finding.

That is, the present invention provides in one aspect an iron-antimony-molybdenum-containing oxide catalyst composition for oxidation reactions, which is an oxide catalyst containing a crystalline iron antimonate having a crystallite size of 100 Å or more, represented by the following empirical formula:

$Fe_aSb_bMo_cL_dK_eM_mN_nQ_qR_rT_tO_x$ wherein L is at least one element selected from the group consisting of Bi and Te; M is at least one element selected from the group consisting of Cu, Mg, Zn, La, Ce, Al, Cr, Mn, Co, Ni and Sn (preferably at least one element selected from the group consisting of Mg, Zn, Ce, Cr, Mn, Co and Ni); N is at least one element selected from the group consisting of Be, Ca, Sr, Ba, Y, Pr, Nd, Th, U, Ti, Zr, Hf, Nb, Ta, Re, Os, Rh, Ir, Pd, Pt, Ag, Au, Cd, Ga, In, Ge and Pb (preferably at least one element selected from the group consisting of Ti, Zr, Nb, Pd, Ag, Ge and Pb); Q is at least one element selected from the group consisting of V and W; R is at least one element selected from the group consisting of Li, Na, Rb, Cs and Tl (preferably at least one element selected from the group consisting of Li, Na and Cs); T is at least one element selected from the group consisting of B, P, As and Se (preferably B and/or P); a, b, c, d, e, m, n, q, r, t and x each is an atomic ratio, wherein when a is 10, b is 5 to 60 (preferably 6 to 30, more preferably 7 to 25), c is 5 to 30 (preferably 6 to 20, more preferably 8 to 10), d is 0.01 to 10 (preferably 0.1 to 8, more preferably d/c=not larger than 0.5 with d=0.3 to 3), e is 0.01 to 5 (preferably 0.02 to 2, more preferably 0.05 to 1.5), m is 0 to 30 (preferably 0 to 20), n is 0 to 10 (preferably 0 to 5), q is 0 to 5 (preferably 0 to 4), r is 0 to 3 (preferably 0 to 2.5), t is 0 to 5 (preferably 0 to 4) and x is a number of oxygen atoms as determined corresponding to the oxides formed by combining the above mentioned components.

The present invention provides in another aspect a process for preparing an iron-antimony-molybdenum-containing oxide catalyst composition for oxidation reactions, which comprises preparing an aqueous slurry containing (i) iron antimonate, (ii) molybdenum, (iii) at least one element selected from the group consisting of bismuth and tellurium, and (iv) potassium as principal components or an aqueous slurry containing the principal components [(i), (ii), (iii) and (iv)] and (v) at least one element selected from the group consisting of catalytic components represented by M, N, Q, R and T in the above described empirical formula; drying the aqueous slurry; and calcining the dried material.

DETAILED DESCRIPTION OF THE INVENTION

An important aspect of the catalyst composition of the present invention resides in that the catalyst composition contains the elements of Fe, Sb, Mo, L (namely, at least one element of Bi and Te) and K as the principal components in the range defined above and iron antimonate crystallite having a given size of 100 Å or more must be present as a crystalline phase. When iron antimonate is not present as the crystalline phase in the catalyst composition, the yields of the desired products are lowered and the physical properties of the catalyst are deteriorated, even when each component is present in the range defined above.

When the ratio of the Sb component is lower than the lower limit, the selectivity of the desired product is lowered, while when the ratio is higher than the upper limit, catalyst activity is lowered and physical properties become poor. A catalyst having a proper activity cannot be obtained when the ratio of the Mo component is lower than the lower limit or higher than the upper limit. The L component (Bi or Te component) increases the yield of the desired product. Unless the catalyst composition contain this component, the formation of carbon dioxide gas is increased. The Bi component and the Te component can be simultaneously used. When the ratio of the K component is lower than the lower limit, the yield of the desired product is lowered, while when the ratio is higher than the upper limit, the reaction rate is remarkably lowered and the yield of the desired product is reduced. This characteristic is unique to potassium, but other alkali metal elements fail in this characteristic. Other M, N, Q, R and T components can be optionally used by properly choosing them to properly control reaction rate, the ratio of the formation of by-products and the physical properties of the catalyst. When P is employed as the T component, the atomic ratio of P/Fe is not higher than 0.3, preferably not higher than 0.2 by atomic ratio. Further, it is preferred that the atomic ratio of P/Sb is not higher than 0.15.

Several iron antimonates such as $FeSbO_4$, $FeSb_2O_4$, $FeSb_2O_6$ and $FeSb_5O_{12}$ are known, and $FeSbO_4$ is most widely known. The invention includes any known iron antimonate, but the iron antimonate in the catalyst composition of the present invention preferably includes $FeSbO_4$. The structure of iron antimonate is known by X-ray diffraction data as described, for example, in J. Korinth, P. Royen, Z. Anorg. Allg. Chem., 340, 146-157 (1965).

The presence of crystalline iron antimonate in the catalyst composition of the present invention can be confirmed by X-ray diffraction. The term "crystalline iron antimonate" as used herein refers to not only pure iron antimonate, but also iron antimonate in the form of a solid solution containing various elements dissolved therein. Further, it is not necessary that all of the Fe component and the Sb component form crystalline iron antimonate. A part of the Fe component or the Sb component may exist in the free form or in the form of other compounds.

The presence of crystalline iron antimonate can be confirmed by X-ray diffraction as mentioned above. It is preferred that crystallite has a size which is not smaller than a given size. The size of the crystallite can be calculated from the results of X-ray diffraction by Sherrer's method as described, for example, in Harold P. K. and Leroy E. A., X-Ray Difraction Procedures, John Wiley & Son Inc., New York, page 511 (1954). The main peak $2\theta = 35.0°$ of iron antimonate is used to define size $D_{101}$ [Å] of the crystallite.

The crystallite size can be calculated from the following formula.

$$D_{101} = \frac{1.0\lambda}{\beta \cos\theta}$$

wherein $D_{101}$ is the size [Å] of the crystallite (the size of the crystallite perpendicular to the (101) face); $\lambda$ is a wavelength [Å] of the measuring X-rays used ($CuK_{\alpha l}$ ray being used); $\beta$ is the integral line breadth (radian) of diffraction; and $\theta$ is Bragg angle of diffraction.

In this measurement, RINT 1100 manufactured by K. K. Rigaku and Application Software "Crystallite Size and Lattice Strain Analysis System" were used, and the measurement was made under the following conditions.
Target Cu
Excitation voltage: 40 KV
Excitation current: 40 mA
Monochromator: Used
Receiving slit of monochromator: 0.80 mm
Divergent slit: 1°
Scattering slit: 1°
Receiving slit: 0.15 mm Sampling interval: 0.020°
Scanning speed: 0.75°/min
Quartz sand having a size of 350 to 500 mesh was used as the standard sample.

The crystallite size of iron antimonate is not smaller than 100 Å, preferably not smaller than 200 Å, more preferably 300 Å to 1,000 Å. When the crystallite size of iron antimonate is smaller than the above size, the yield of the desired product is generally lowered, and the formation of carbon dioxide and carbon monoxide is increased.

The catalyst composition of the present invention can be used without a carrier, but it is preferred that the catalyst composition is supported on an appropriate carrier. Examples of the carrier include silica, alumina, silica-alumina, titania, silica-titania, zirconia and silicon carbide, preferably silica.

It is preferred that the catalyst composition of the present invention is prepared by previously preparing crystalline iron antimonate and then mixing other components.

The crystalline iron antimonate can be prepared by mixing an iron compound with an antimony compound and heating the mixture to react them. Concretely, examples of the preparation of the crystalline iron antimonate include a method (1) wherein ferric oxide is mixed with antimony trioxide and the mixture is calcined in air as described, for example, in Von J. Korinth and P. Royen, *Z. Anorg. Allg. Chem.*, Vol. 340, pp. 146-157 (1965); a method (2) wherein iron nitrate is mixed with antimony trioxide and the mixture is calcined in air as described, for example, in I. Aso, S. Furukawa, N. Yamazoe and T. Seiyama, *J. Catal.*, Vol. 64, pp. 29-37 (1980); a method (3) wherein iron nitrate is mixed with antimonic acid and the mixture is calcined as described, for example, in U.S. Pat. No. 3,686,138; and a method (4) wherein an aqueous slurry containing a mixture of iron nitrate, antimony trioxide and optionally nitric acid is prepared and heated, or further dried and calcined as described, for example, in U.S. Pat. No. 3,657,155. However, methods for preparing iron antimonate are not limited to the above mentioned methods.

In the method (4), it is preferred that the aqueous slurry is heat-treated while retaining the form of the slurry under uniform stirring. The heating temperature is about 40° to about 150° C., preferably about 80° to about 100° C., for from about 10 minutes to 50 hours. Preferably, the pH of the slurry is adjusted to not higher than about 7, preferably about 1 to about 4 before heat treatment. In this method (4), the calcination of the mixture of an iron compound and an antimony compound is carried out at a temperature of 300° to 1,200° C., preferably 500° to 1,000° C. for 0.5 to 50 hours. Among the above described preparation methods, the method (4) is particularly preferred. Small amounts of other components than iron and antimony may be allowed to coexist during the preparation of iron antimonate.

Examples of the iron compound which can be used as the starting material include iron oxides such as ferrous oxide, ferric oxide and tri-iron tetroxide; iron salts of inorganic acids such as ferrous chloride, ferric chloride, ferric nitrate and iron carbonate; iron salts of organic acids such as iron oxalate and iron citrate; and iron dissolved in nitric acid.

Examples of the antimony compound include antimony trioxide, antimony tetroxide, antimony pentoxide, antimonic acid, polyantimonic acid, sodium antimonate, potassium antimonate, antimony trichloride and antimony pentachloride.

It can easily be confirmed by X-ray diffraction whether the crystalline iron antimonate is formed or not.

An aqueous slurry containing the thus-obtained crystalline iron antimonate, a raw material for the molybdenum component, a raw material for the potassium component, at least one member selected from the group consisting of raw materials for bismuth and tellurium components and optionally at least one member selected from the group consisting of raw materials for M, N, Q, R and T components is prepared. Subsequently, the slurry is dried and calcined to obtain a catalyst composition. The calcination after drying is carried out at a temperature of about 400° to about 800° C., preferably about 500° to about 750° C. for about 10 minutes to about 20 hours, preferably about 0.5 to about 10 hours.

Examples of the raw material for the molybdenum component include molybdenum trioxide, molybdic acid, molybdates such as ammonium paramolybdate and ammonium metamolybdate, phosphomolybdic acid and salts thereof.

Examples of the raw material for the bismuth component include elemental bismuth, bismuth trioxide, bismuth nitrate, bismuth sulfate, bismuth carbonate and bismuth hydroxide.

Examples of the raw material for the tellurium component include elemental tellurium, tellurium dioxide, tellurium trioxide, telluric acid and tellurium nitrate.

Examples of the raw material for the potassium component include potassium oxide, potassium hydroxide, potassium nitrate and potassium carbonate.

The starting materials for the M, N, Q, R and T in the empirical formula are used in the form of oxides, hydroxides, nitrates, carbonates or salts of organic acids.

Examples of the raw material for the carrier include silica sol, silica hydrogel, fumed silica, alumina sol, alumina powder, titania sol and titania powder.

Particularly preferred preparation methods of the catalyst compositions of the present invention are the following methods.

(1) A method wherein a crystalline iron antimonate is previously prepared, and an aqueous slurry having a pH of not higher than 5 and containing a mixture of the thus-prepared crystalline iron antimonate with a molybdenum compound, at least one compound selected from the group consisting of a bismuth compound and a tellurium compound, a potassium compound and optionally a raw material for the carrier is prepared, dried and calcined.

(2) A method wherein a crystalline iron antimonate is previously prepared, and an aqueous slurry having a pH of not lower than 7 and containing a mixture of the thus-prepared crystalline iron antimonate with a molybdenum compound, at least one compound selected from the group consisting of a bismuth compound and a tellurium compound, a potassium compound and optionally a raw material for the carrier is prepared, dried and calcined.

(3) A method wherein a crystalline iron antimonate is previously prepared, and an aqueous slurry having a pH of not lower than 6 and containing the thus-prepared crystalline iron antimonate, a molybdenum compound, at least one compound selected from the group consisting of a bismuth compound and a tellurium compound, a potassium compound, a chelating agent and optionally a raw material for the carrier is prepared, dried and calcined.

(4) A method wherein a crystalline iron antimonate is previously prepared; an aqueous slurry having a pH of not lower than 6 and containing the thus-prepared crystalline iron antimonate, a molybdenum compound, a chelating agent and optionally a raw material for the carrier is prepared; at least one compound selected from the group consisting of a bismuth compound and a tellurium compound is added to said aqueous slurry; and the resulting aqueous slurry containing the above described components and a potassium compound is dried and calcined, said potassium compound being added at any one of the above stages.

(5) A method wherein a crystalline iron antimonate is previously prepared; an iron compound, a chelating agent and optionally at least one compound selected from the group consisting of a bismuth compound and a tellurium compound are added to an aqueous slurry having a pH of not lower than 6 and containing the thus-prepared crystalline iron antimonate, a molybdenum compound, at least one compound selected from the group consisting of a bismuth compound and a tellurium compound, and optionally a raw material for the carrier; and the resulting aqueous slurry containing the above described components and a potassium compound is dried and calcined, said potassium compound being added at any one of the above stages.

When a silica sol is used as a carrier material, the preparation method (1), (3), (4) or (5) is preferably used. When the slurry also contains a chelating agent as in the preparation methods (3), (4) and (5), the gelation of the slurry is inhibited and thus the slurry is maintained at low viscosity and the properties of the slurry are stabilized. As a result, the catalyst obtained has large strength.

As stated above, while the mechanism of the effects produced by addition of the chelating agent is not clear, what is important is that gelation of the slurry is inhibited. While not desiring to be bound, it may well be that the chelating agent when present serves as a metallic ion making agent to inhibit metallic ions from neutralizing the charges of the silica sol particles.

Examples of suitable chelating agents which can be used include amines, e.g., ethylenediamine, trimethylenediamine, triethanolamine, and pyridine; aminopolycarboxylic acids, e.g., ethylenediaminediacetic acid, ethylenediaminetetraacetic acid, and nitrilotriacetic acid; polycarboxylic acids, e.g., oxalic acid, succinic acid, maleic acid, fumaric acid, and diglycolic acid; hydroxycarboxylic acids, e.g., lactic acid, malic acid, tartaric acid, citric acid, and gluconic acid; sulfur compounds, e.g., thioglycolic acid, thiodiglycolic acid, and mercaptopropanol; amino acids, e.g., glycine and alanine; ketones, e.g., acetylacetone and acetonylacetone; phosphonic acids, e.g., phosphonopropane-1,2,3-tricarboxylic acid.

The amount of the chelating agent to be added preferably ranges from 0.1 to 10% by weight based on the weight of the oxide catalyst ultimately obtained.

The catalyst of the present invention may be used either in a fixed bed or in a fluidized bed.

When a catalyst for use in the fixed bed is to be produced, an aqueous slurry prepared in the manner mentioned above is dried, or dried and calcined, and the resulting material is molded by means of pelletizing or extrusion.

When a catalyst for use in the fluidized bed is to be produced, it is preferred that an aqueous slurry, particularly an aqueous slurry containing a silica carrier material, prepared in the manner mentioned above is spray-dried to form fine spherical particles. In this case, an aqueous slurry prepared by the above method (1) or (3) or a combination of the method (3) with the method (4) or (5) is preferred. The spray drying of the slurry can be carried out by using any conventional spray drier such as a rotary disc type, high pressure nozzle type or two-fluid nozzle type drier. Fluidized bed calciners can be used for calcination. The size of the catalyst particle can be suitably chosen according to purpose. Catalyst particles for use in the fixed bed have generally a particle size of 2 to 10 mm and are in a cylindrical or spherical form. Catalyst particles for use in the fluidized bed have generally a particle size of 10 to 150 $\mu$m.

The catalyst of the present invention is suitable for use in the oxidation reactions of organic compounds, that is, oxidation reactions, ammoxidation reactions and oxidative dehydrogenation reactions, and particularly ammoxidation reactions of olefinic hydrocarbons or alcohols.

Examples of the organic compounds which can be subjected to these reactions include propylene, isobutene, methanol, methylal, dimethyl ether, tertiary butanol, methyl tert-butyl ether, butene, acrolein, methacrolein, formaldehyde and acetaldehyde. The corresponding aldehydes, nitriles and dienes can be obtained in high yields. For example, acrolein can be obtained by the oxidation of propylene. Methacrolein can be obtained by the oxidation of isobutene or tert-butanol. Prussic acid can be obtained by the ammoxidation of methanol. Acetonitrile can be obtained by the ammoxidation of ethanol. Acrylonitrile can be obtained by the ammoxidation of acrolein. Methacrylonitrile can be obtained by the ammoxidation of methacrolein. Acrylonitrile can be obtained by the ammoxidation of propylene. Methacrylonitrile can be obtained by the ammoxidation of isobutene or tert-butanol. The ammoxidation of methyl tert-butyl ether gives methacrylonitrile and prussic acid. Butadiene can be produced by the oxidative dehydrogenation reaction of butene.

Further, acrylonitrile and prussic acid can be simultaneously produced by the coammoxidation of propylene and methanol. Methacrylonitrile and prussic acid can be simultaneously produced by the coammoxidation of isobutene and methanol.

These reactions can be carried out under conventional conditions. A mixed gas comprising 1 to 50% by volume of a starting organic compound and 1 to 50% by volume of oxygen is reacted at a temperature of 250° to 500° C. under a pressure of from atmospheric pressure to 5 atm. When the ammoxidation reaction is carried out, the starting mixed gas contains further 1 to 50% by volume of ammonia in addition to the starting organic compound and oxygen. Contact time is 0.1 to 20 seconds. The reaction can be carried out either in the fixed bed or in the fluidized bed.

When conventional iron-antimony-containing oxide catalysts for use in the oxidation, ammoxidation and oxidative dehydrogenation reactions of the organic compounds contain a large amount of the molybdenum component, catalyst activity is lowered, while according to the present invention, the iron-antimony-containing catalyst composition containing a relatively large amount of the molybdenum component and having good activity as well as good physical properties can be provided, and the catalyst composition can be produced with good reproducibility.

The catalyst composition of the present invention gives the desired products at high selectivity and high reaction rate even when the molar ratio of oxygen/ the starting organic compound in the feed gas is low, that is, the concentration of the starting organic compound is increased. Accordingly, the catalyst composition of the present invention exhibits high productivity in the industrial practical use.

The present invention is now illustrated in greater detail with reference to the following examples which, however, are not to be construed as limiting the invention in any way.

EXAMPLE 1

A catalyst having the empirical formula $Fe_{10}Sb_{1.0}Mo_{8.5}Bi_{1.5}K_{0.2}Ni_5B_{0.75}P_{0.55}O_{75.35}(SiO_2)_{45}$ was prepared in the following manner (Catalyst 1).

Preparation of Slurry (A)

930.5 g of nitric acid (specific gravity: 1.38) was mixed with 843 ml of water, the mixture was heated and 104.7 g of electrolytic iron powder was added portionwise thereto to dissolve it. 324.4 g of antimony trioxide powder was weighed and added to the nitric solution of iron prepared above. The resulting slurry was heated at 100° C. for 2 hours while stirring well. The solid in the slurry was examined by X-ray diffractometry and it was found that crystalline iron antimonate was formed. A solution of 10.2 g of boric acid in 194 ml of water was added to the slurry with stirring, and 8.9 g of an 85 wt. % aqueous solution of phosphoric acid was then added thereto. The thus-obtained slurry was spray-dried by using a rotary disc type spray drier (inlet temperature and outlet temperature were controlled to 320° C. and 160° C., respectively). The resulting particles were heat-treated at 250° C. and calcined at 950° C. for 3 hours. 400 g of the calcined particles was added to 600 ml of water and crushed in a ball mill for 16 hours to prepare an aqueous slurry (40 wt. %). The resulting crystalline iron antimonate-containing slurry is referred to as slurry (A).

Preparation of Slurry (B)

3.3 g of an 85 wt. % aqueous solution of phosphoric acid was added to 1,915 g of 20 wt. % silica sol. A solution of 212.5 g of ammonium paramolybdate dissolved in 640 ml of water was added to the above solution with stirring. Subsequently, a solution of 210.1 g of nickel nitrate in 210 ml of water, a solution of 87.6 g of iron nitrate in 88 ml of water, a solution of 2.9 g of potassium nitrate in 14.5 ml of water and a solution of 105.2 g of bismuth nitrate in 105 ml of 10 wt. % nitric acid in order were added thereto. The pH of the resulting slurry was 0.9. The slurry was heat-treated under reflux at 100° C. for 1 hour. The resulting slurry is referred to as slurry (B).

831.1 g of the crystalline iron antimonate-containing slurry (A) was added to the above slurry (B) with stirring. The mixture was spray-dried by using a rotary disc type spray drier (inlet temperature and outlet temperature were controlled to 320° C. and 160° C., respectively). The resulting particles were heat-treated at 250° C., calcined at 400° C. for 2 hours and finally calcined at 530° C. for 3 hours. The crystallite size of iron antimonate in the catalyst was 581 Å.

EXAMPLE 2

A catalyst having the same composition as that of the catalyst 1 was prepared in the same manner as in Example 1 except that aqueous ammonia (15 wt. %) was added to the slurry (B) before heat treatment to adjust the pH thereof to 9.5 (Catalyst 2).

EXAMPLE 3

A catalyst having the empirical formula $Fe_{10}Sb_8Mo_{8.5}Bi_{1.5}K_{0.2}Ni_5Mg_{0.85}P_{1.0}O_{71.2}(SiO_2)_{45}$ was prepared in the following manner (Catalyst 3).

An aqueous slurry (40 wt. %) containing crystalline iron antimonate and phosphorus was prepared in the same manner as in the preparation of the slurry (A) of Example 1 except that the calcination of the particles was carried out at 900° C. for 3 hours. A slurry containing the molybdenum, phosphorus, bismuth, potassium, nickel, iron and magnesium components and silica sol was prepared in the same manner as in the preparation of the slurry (B) of Example 2. The slurry was mixed with the above crystalline iron antimonate-containing slurry. The desired catalyst was prepared according to the method of the preparation of Example 1.

EXAMPLE 4

A catalyst having the empirical formula $Fe_{10}Sb_{2.5}Mo_{8.5}Bi_{1.5}Te_3K_{0.2}Ni_{5.5}B_{1.0}O_{119.85}(SiO_2)_{45}$ was prepared in the following manner (Catalyst 4).

Preparation of Slurry (A)

A mixture of 838.1 g of nitric acid (specific gravity: 1.38) with 759 ml of water, a solution of 94.3 g of electrolytic iron powder, 730.1 g of antimony trioxide powder and 12.3 g of boric acid in 234 ml of water and a solution obtained by dissolving 76 g of elemental tellurium powder in 259 ml of 35 wt. % hydrogen peroxide solution with heating were prepared. An aqueous slurry (40 wt. %) containing crystalline iron antimonate was prepared in the same manner as in the preparation of the slurry (A) of Example 1 except that the calcination of the particles was carried out at 850° C. for 3 hours.

Preparation of Slurry (B)

A solution of 150.5 g of ammonium paramolybdate in 452 ml of water was added to 1,356 g of 20 wt. % silica sol with stirring. Subsequently, a solution of 13.1 g of ammonium paratungstate in 262 ml of water, a solution of 163.7 g of nickel nitrate in 164 ml of water, a solution of 62.0 g of iron nitrate in 62 ml of water, a solution of 2.0 g of potassium nitrate in 10 ml of water and a solution of 74.5 g of bismuth nitrate in 74.5 ml of 10 wt. % nitric acid in order were added thereto. 24 g of citric acid was dissolved in the resulting solution, and aqueous ammonia (15 wt. %) was added thereto to adjust the pH of the slurry to 9.0. The slurry was heat-treated under reflux at 100° C. for 1 hour.

To the slurry (B) was added 1,313.1 g of the above crystalline iron antimonate-containing slurry (A) with stirring, and the resulting slurry was dried and calcined according to the method of the preparation of Example 1.

EXAMPLE 5

A catalyst having the empirical formula $Fe_{10}Sb_{1.0}Mo_6Bi_{1.5}K_{0.4}Co_3Mn_{0.3}Cr_{0.3}Cs_{0.05}O_{64.23}(SiO_2)_{60}$ was prepared in the following manner (Catalyst 5).

An aqueous slurry (40 wt. %) containing crystalline iron antimonate was prepared in the same manner as in the preparation of the slurry (A) of Example 1. A slurry containing the molybdenum, cobalt, manganese, chromium, iron, potassium, cesium and bismuth components, silica sol and citric acid was prepared in the same manner as in the preparation of the slurry (B) of Example 4. The slurry was mixed with the above crystalline iron antimonate-containing slurry, and the desired catalyst was prepared according to the method of Example 1.

EXAMPLE 6

A catalyst having the empirical formula $Fe_{10}Sb_{1.0}Mo_{15}Bi_{1.5}K_{0.4}Ni_6La_{0.5}V_{0.05}Li_{0.2}O_{92.175}(SiO_2)_{60}$ was prepared in the following manner (Catalyst 6).

An aqueous slurry (40 wt. %) containing crystalline iron antimonate, lithium and a small amount of molybdenum was prepared in the same manner as in the preparation of the slurry (A) of Example 1 except that the calcination of the particles was carried out at 900° C. for 3 hours. A slurry containing the molybdenum, vanadium, nickel, lanthanum, iron, potassium and bismuth components, silica sol and citric acid was prepared in the same manner as in the preparation of the slurry (B) of Example 4. The slurry was mixed with the above crystalline iron antimonate-containing slurry, and the desired catalyst was prepared according to the method of Example 1.

EXAMPLE 7

A catalyst having the empirical formula $Fe_{10}Sb_{1.6}Mo_{9.0}Bi_{0.5}K_{0.6}Ni_4Co_4Pd_{0.01}O_{91.15}(SiO_2)_{45}$ was prepared in the following manner (Catalyst 7).

An aqueous slurry (40 wt. %) containing crystalline iron antimonate and cobalt was prepared in the same manner as in Example 1. A slurry containing the molybdenum, nickel, iron, potassium, palladium and bismuth components and silica sol was prepared in the same manner as in the preparation of the slurry (B) of Example 4 except that the pH of the slurry was 8.5 before heat treatment. The slurry was mixed with the above crystalline iron antimonate-containing slurry, and the desired catalyst was prepared according to the method of Example 1.

EXAMPLE 8

A catalyst having the empirical formula $Fe_{10}Sb_{1.6}Mo_{9.0}Bi_{3.0}Te_{1.5}K_{0.6}Ni_6Zn_{0.5}O_{96.03}(SiO_2)_{45}$ was prepared in the following manner (Catalyst 8).

Preparation of Slurry (A)

1,168.3 g of nitric acid (specific gravity: 1.38) was mixed with 1,058 ml of water, the mixture was heated and 131.5 g of electrolytic iron powder was added portionwise thereto to dissolve it. 692.4 g of antimony trioxide powder was weighed and added to the above nitric acid solution of iron. The mixture was heated at 100° C. for 2 hours while stirring well. To the resulting slurry were added a solution of 52.0 g of ammonium paramolybdate in 156 ml of water, a solution obtained by dissolving 56.3 g of elemental tellurium powder in 193 ml of 35 wt. % hydrogen peroxide solution with heating, and a solution of 218.5 g of bismuth nitrate in 219 ml of 10 wt. % nitric acid in order. The resulting slurry was dried, calcined and crushed according to the method of Example 1 except that the calcination was carried out at 850° C. for 3 hours. There was obtained an aqueous slurry (40 wt. %) containing crystalline iron antimonate.

Preparation of Slurry (B)

A solution of 190.9 g of ammonium paramolybdate dissolved in 573 ml of water was added to 769.5 g of 20 wt. % silica sol. Subsequently, a solution of 202.7 g of nickel nitrate in 205 ml of water, a solution of 17.3 g of zinc nitrate in 18 ml of water, a solution of 6.9 g of potassium nitrate in 35 ml of water and a solution of 84.5 g of bismuth nitrate in 85 ml of 10 wt. % nitric acid in order were added thereto. 16.5 g of tartaric acid was dissolved in the resulting slurry, and ammonia water was added thereto to adjust pH to 8.5. The slurry was heat-treated under reflux at 100° C. for 1 hour. To the slurry were added a solution of 11 g of citric acid and 46.9 g of iron nitrate in 58 ml of water, and 769.5 g of 20 wt. % silica sol.

To the resulting slurry (B) was added 1,149.5 g of the above crystalline iron antimonate-containing slurry (A) with stirring. The resulting slurry was dried and calcined in the same manner as in Example 1.

EXAMPLE 9

A catalyst having the empirical formula $Fe_{10}Sb_{1.0}Mo_{8.5}Bi_{1.0}K_{0.05}Ni_{5.5}Ti_{3.0}Zr_{0.5}P_{0.75}O_{81.4}(SiO_2)_{45}$ was prepared in the following manner (Catalyst 9).

An aqueous slurry (40 wt. %) containing crystalline iron antimonate, titanium and phosphorus was prepared in the same manner as in the preparation of the slurry (A) of Example 1 except that the calcination of the particles was carried out in a nitrogen atmosphere at 850° C. for 3 hours. A slurry containing the molybdenum, nickel, zirconium, iron, potassium and bismuth components, silica sol and gluconic acid was prepared in the same manner as in the preparation of the slurry (B) of Example 8. The slurry was mixed with the above crystalline iron antimonate-containing slurry. The desired catalyst was prepared according to the method of Example 1.

EXAMPLE 10

A catalyst having the empirical formula $Fe_{10}Sb_{1.0}Mo_{8.5}Bi_{1.0}K_{1.5}Ni_5Cu_{0.5}Nb_{0.5}Na_{0.25}O_{74.2}(SiO_2)_{45}$ was prepared in the following manner (Catalyst 10).

An aqueous slurry (40 wt. %) containing crystalline iron antimonate, potassium and copper was prepared in the same manner as in the preparation of the slurry (A) of Example 1 except that the calcination of the particles was carried out in a steam atmosphere at 850° C. for 3 hours. A slurry containing the molybdenum, nickel, iron, potassium, sodium, bismuth and niobium components, gluconic acid and silica sol was prepared in the same manner as in the preparation of the slurry (B) of Example 8. The slurry was mixed with the above crystalline iron antimonate-containing slurry, and the desired catalyst was prepared according to the method of Example 1.

EXAMPLE 11

A catalyst having the empirical formula $Fe_{10}Sb_{1.0}Mo_{8.5}Bi_{1.5}K_{0.2}Ni_5O_{72.85}(SiO_2)_{70}$ was prepared in the following manner (Catalyst 11).

An aqueous slurry (40 wt. %) containing crystalline iron antimonate was prepared in the same manner as in the preparation of the slurry (A) of Example 1 except that the calcination of the particles was carried out at 1,000° C. for 3 hours. A slurry containing the molybdenum, nickel, potassium and iron components, citric acid, gluconic acid and silica sol was prepared in the same manner as in the preparation of the slurry (B) of Example 4 except that the bismuth component was added to the slurry after heat treatment. The slurry was mixed with the above crystalline iron antimonate-containing slurry, and the desired catalyst was prepared according to the method of Example 1.

EXAMPLE 12

A catalyst having the empirical formula $Fe_{10}Sb_{1.5}Mo_{9.0}Bi_{1.0}K_{0.5}Ni_{5.5}Rb_{0.05}O_{86.775}(SiO_2)_{45}$ was prepared in the following manner (Catalyst 12).

Preparation of Slurry (A)

104.1 g of iron trioxide and 380.1 g of antimony trioxide were weighed and thoroughly mixed in a mixer. The mixture was calcined at 600° C. in a muffle furnace for 2 hours. The calcined product was crushed and an aqueous slurry (40 wt. %) containing crystalline iron antimonate was prepared in the same manner as in Example 1.

Preparation of Slurry (B)

A solution of 202.5 g of ammonium paramolybdate in 608 ml of water was added to 861.4 g of 20% silica sol with stirring. Subsequently, a solution of 208 g of nickel nitrate in 208 ml of water and a solution of 0.94 g of rubidium nitrate and 6.4 g of potassium nitrate in 37 ml of water in order were added thereto. 24.8 g of citric acid was dissolved in the resulting slurry, and aqueous ammonia (15 wt. %) was added thereto to adjust the pH of the slurry to 9.5. The slurry was heat-treated under reflux at 100° C. for 1 hour. To the solution were added a solution of 131.3 g of iron nitrate and 28 g of citric acid in 260 ml of 15% aqueous ammonia (15 wt. %), a solution of 63.1 g of bismuth nitrate in 63 ml of 10% nitric acid and 861.4 g of 20% silica sol.

To the slurry (B) was added 963.7 g of the above crystalline iron antimonate-containing slurry (A) with stirring, and the slurry was dried and calcined according to the method of Example 1.

EXAMPLE 13

A catalyst having the empirical formula $Fe_{10}Sb_{1.0}Mo_{9.0}Bi_{2.0}K_{0.6}Ni_{5.5}W_{0.3}P_{0.75}B_{0.75}O_{79.7}(SiO_2)_{70}$ was prepared in the following manner (Catalyst 13).

An aqueous slurry (40 wt. %) containing crystalline iron antimonate, phosphorus and boron was prepared in the same manner as in the preparation of the slurry (A) of Example 1. A slurry containing the molybdenum, tungsten, nickel, potassium, iron and bismuth components, citric acid and silica sol was prepared in the same manner as in the preparation of the slurry (B) of Example 12 except that the pH of the slurry was 9.0 before heat treatment. The slurry was mixed with the above crystalline iron antimonate-containing slurry, and the desired catalyst was prepared according to the method of Example 1.

EXAMPLE 14

A catalyst having the empirical formula $Fe_{10}Sb_{1.5}Mo_8Bi_{2.5}K_{0.1}W_{0.25}P_1O_{72.3}(SiO_2)_{45}$ was prepared in the following manner (Catalyst 14).

An aqueous slurry (40 wt. %) containing crystalline iron antimonate and phosphorus was prepared in the same manner as in the preparation of the slurry (A) of Example 1. A slurry containing the molybdenum, tungsten, phosphorus, iron, potassium and bismuth components, citric acid and silica sol was prepared in the same manner as in the preparation of the slurry (B) of Example 8 except that the pH of the slurry was 9.0 before heat treatment, and the bismuth component was added to the slurry after heat treatment. The slurry was mixed with the above crystalline iron antimonate-containing slurry, and the desired catalyst was prepared according to the method of Example 1.

COMPARATIVE EXAMPLE 1

A catalyst having the same composition as that of the catalyst 1 was prepared in the following manner (Comparative Catalyst 1-1).

To 1,915 g of 20 wt. % silica sol were added 9.0 g of an 85 wt. % aqueous solution of phosphoric acid and a solution of 6.6 g of boric acid in 125 ml of water. A solution of 212.5 g of ammonium paramolybdate in 640 ml of water was added to the resulting solution with stirring. Subsequently, a solution of 210.1 g of nickel nitrate in 210 ml of water, a solution of 583.9 g of iron nitrate in 584 ml of water, a solution of 2.9 g of potassium nitrate in 14.5 ml of water and a solution of 105.2 g of bismuth nitrate in 105 ml of 10 wt. % nitric acid in order were added thereto. Finally, 208.5 g of antimony trioxide was weighed and added thereto while stirring well. The slurry was dried and calcined according to the method of the preparation of the catalyst 1. The catalyst was examined by X-ray diffractometry, and it was found that crystalline iron antimonate was not formed.

A catalyst having the same composition as that of the catalyst 1 was prepared in the same manner as in the preparation of the catalyst 1 except that the calcination of the particles in the preparation of the slurry (A) was carried out at 250° C. (Comparative Catalyst 1-2).

COMPARATIVE EXAMPLE 2

A catalyst having the empirical formula $Fe_{10}Sb_4Mo_{8.5}Bi_{1.5}K_{0.2}Ni_5B_{0.75}P_{0.55}O_{60.35}(SiO_2)_{45}$ was prepared in the same manner as in Example 1 except that the amount of the raw material used for the antimony component was 1/2.5 of that used in the preparation of the catalyst 1 (Comparative Catalyst 2).

COMPARATIVE EXAMPLE 3

A catalyst having the empirical formula $Fe_{10}Sb_{7.0}Mo_{8.5}Bi_{1.5}Te_3K_{0.2}Ni_{5.5}W_{0.5}B_{1.0}O_{233.35}(SiO_2)_{45}$ was prepared in the same manner as in Example 4 except that the amount of the raw material used for the antimony component was 2.8 times that used in the preparation of . the catalyst 4 (Comparative Catalyst 3).

COMPARATIVE EXAMPLE 4

A catalyst having the empirical formula $Fe_{10}Sb_{1.0}Mo_3Bi_{1.5}K_{0.4}Co_3Mn_{0.3}Cr_{0.3}Cs_{0.05}O_{55.53}(SiO_2)_{60}$ was prepared in the same manner as in Example 5 except that the amount of the raw material used for the molybdenum component was ⅜ of that used in the preparation of the catalyst 5 (Comparative Catalyst 4).

COMPARATIVE EXAMPLE 5

A catalyst having the empirical formula $Fe_{10}Sb_{1.0}Mo_{40}Bi_{1.5}K_{0.4}Ni_6La_{0.5}V_{0.05}Li_{0.2}O_{169.425}(SiO_2)_{60}$ was prepared in the same manner as in Example 6 except that the amount of the raw material used for the molybdenum component was 3.08 times that used in the preparation of the slurry (B) of the catalyst 6 (Comparative Catalyst 5).

COMPARATIVE EXAMPLE 6

A catalyst having the empirical formula $Fe_{10}Sb_{1.6}Mo_{9.0}K_{0.6}Ni_4Co_4Pd_{0.1}O_{90.4}(SiO_2)_{45}$ was the same manner as in Example 7 except that the bismuth component was omitted (Comparative Catalyst 6).

COMPARATIVE EXAMPLE 7

A catalyst having the empirical formula $Fe_{10}Sb_{1.6}Mo_{9.0}Bi_{6.0}Te_{6.0}K_{0.6}Ni_6Zn_{0.5}O_{110.3}(SiO_2)_{45}$ was prepared in the same manner as in Example 8 except that the raw materials for the bismuth component and the tellurium component were used in the amounts of 3 times and 4 times those used in the preparation of catalyst 8, respectively, (Comparative Catalyst 7).

COMPARATIVE EXAMPLE 8

A catalyst having the empirical formula $Fe_{10}Sb_{1.0}Mo_{8.5}Bi_{1.0}Ni_{5.5}Ti_{3.0}Zr_{0.5}P_{0.75}O_{81.375}(SiO_2)_{45}$ was prepared in the same manner as in Example 9 except that the potassium component was not used (Comparative Catalyst 8).

COMPARATIVE EXAMPLE 9

A catalyst having the empirical formula $Fe_{10}Sb_{1.0}Mo_{8.5}Bi_{1.5}Ni_5Na_{0.2}B_{0.75}P_{0.55}O_{75.35}(SiO_2)_{45}$ was prepared in the same manner as in Example 2 except that sodium was used in place of potassium (Comparative Catalyst 9).

COMPARATIVE EXAMPLE 10

A catalyst having the empirical formula $Fe_{10}Sb_{1.0}Mo_{8.5}Bi_{1.0}Ni_5Cu_{0.5}Nb_{0.5}Na_{1.75}O_{74.2}(SiO_2)_{45}$ was prepared in the same manner as in Example 10 except that sodium was used in place of potassium (Comparative Catalyst 10).

COMPARATIVE EXAMPLE 11

A catalyst having the empirical formula $Fe_{10}Sb_{1.0}Mo_{8.5}Bi_{1.0}K_{6.0}Ni_5Cu_{0.5}Nb_{0.5}Na_{0.25}O_{76.36}(SiO_2)_{45}$ was prepared in the same manner as in Example 10 except that the amount of the raw material used for the potassium component was 4 times that used in the preparation of the catalyst 10 (Comparative Catalyst 11).

COMPARATIVE EXAMPLE 12

A catalyst composed of a catalytic component represented by the empirical formula $Fe_{0.33}Sb_1Mo_1Bi_1O_{6.50}$ and a carrier component of 45 wt. % $SiO_2$ was prepared as a fluidized bed catalyst according to the method described in Example 9 of JP-A-56-97550 (corresponding to Example 12 European Patent 32,618B) (Comparative Catalyst 12).

COMPARATIVE EXAMPLE 13

A catalyst having the empirical formula $Fe_{11}Sb_{1.8}Mo_{10}Bi_{0.04}Te_{0.03}Co_5O_{96.62}(SiO_2)_{45}$ was prepared as a fluidized bed catalyst according to the method described in Example 8 of JP-A-57-114560 (Comparative Catalyst 13).

COMPARATIVE EXAMPLE 14

A catalyst having the empirical formula $Fe_{10}Sb_{2.5}Mo_{1.2}Te_3Co_4W_{0.5}B_1O_{95.1}(SiO_2)_{60}$ was prepared according to the method of the preparation of the catalyst 12 described in JP-B-53-18014 (corresponding to catalyst 12 of U.S. Pat. Nos. 3,988,359 and 4,083,804) (Comparative Catalyst 14).

The activity of the above described catalysts together with catalyst compositions, final calcination conditions, the crystallite size of iron antimonate and activity test conditions is shown in Tables 1 to 3.

The activity tests of the catalysts obtained in Examples 1 to 14 and Comparative Examples 1 to 14 were carried out in the following manner.

Test for Activity of Catalyst

A fluidized bed reactor (the inner diameter of the fluidized zone of the catalyst being 2.5 cm $\phi$ and the height thereof being 40 cm) was packed with a catalyst. Propylene, methanol or tert-butanol was used as the starting compound, and the oxidation or ammoxidation reaction of the starting compound was carried out under predetermined conditions. The activity of each catalyst was evaluated from the yield of the desired product, the conversion of the starting compound and the selectivity of the desired product determined by the following definitions.

Yield (%) of desired product =

$$\frac{\text{Weight (g) of carbon in desired product formed}}{\text{Weight (g) of carbon in starting compound fed}}$$

Conversion (%) of starting compound =

$$\frac{\text{Weight (g) of carbon in starting compound consumed by reaction}}{\text{Weight (g) of carbon in starting compound fed}}$$

Selectivity (%) of desired product =

$$\frac{\text{Weight (g) of carbon in desired product formed}}{\text{Weight (g) of carbon in starting compound consumed by reaction}}$$

Reaction conditions were as follows, reaction pressure was atmospheric pressure, and linear velocity of the gas mixture of the starting materials was 3 cm/sec under the reaction condition.

(1) Ammoxidation of Propylene
Oxygen (fed as air)/propylene = 1.95 (by mol)
Ammonia/propylene = 1.20 (by mol)
(2) Oxidation of Propylene
Oxygen (fed as air)/propylene = 1.53 (by mol)
Water/propylene = 1.7 (by mol)
(3) Ammoxidation of Methanol
Oxygen (fed as air)/methanol = 1.6 (by mol)
Ammonia/methanol = 1.1 (by mol)
(4) Oxidation of Methanol
Oxygen (fed as air)/methanol = 1.6 (by mol)
(5) Ammoxidation of tert-Butanol
Oxygen (fed as air)/tert-butanol = 2.3 (by mol)
Ammonia/tert-butanol = 1.2 (by mol)
Water/tert-butanol = 0.5 (by mol)
(6) Oxidation of tert-Butanol
Oxygen (fed as air)/tert-butanol = 2.0 (by mol)
Water/tert-butanol = 0.5 (by mol)

TABLE 1

| Catalyst No. | \multicolumn{14}{c}{Catalyst Composition (atomic ratio)} | | Final Calcination Condition | | Size of Iron Antimonate Crystallite (Å) |
|---|---|---|---|---|---|---|---|---|---|---|---|---|---|---|---|---|---|
| | Fe | Sb | Mo | L Bi | L Te | K | M | | N | Q | R | T | | SiO₂ | Temp. (°C.) | Time (hr) | |
| Catalyst 1 | 10 | 10 | 8.5 | 1.5 | — | 0.2 | Ni 5.0 | | — | — | — | B 0.75 | P 0.55 | 45 | 530 | 3 | 581 |
| Catalyst 2 | 10 | 10 | 8.5 | 1.5 | — | 0.2 | Ni 5.0 | | — | — | — | B 0.75 | P 0.55 | 45 | 580 | " | 583 |
| Catalyst 3 | 10 | 8 | 8.5 | 1.5 | — | 0.2 | Mg 0.85 | Ni 5.0 | — | — | — | P 1.0 | | 45 | " | " | 481 |
| Catalyst 4 | 10 | 25 | 8.5 | 1.5 | 3 | 0.2 | Ni 5.5 | | — | W 0.5 | — | B 1.0 | | 60 | " | " | 526 |
| Catalyst 5 | 10 | 10 | 6 | 1.5 | — | 0.4 | Cr 0.3 Mn 0.3 | Co 3 | — | — | Cs 0.05 | — | | 60 | " | " | 364 |
| Catalyst 6 | 10 | 10 | 15 | 1.5 | — | 0.4 | La 0.5 | Ni 6 | — | V 0.05 | Li 0.2 | — | | 60 | 560 | " | 513 |
| Catalyst 7 | 10 | 16 | 9.0 | 0.5 | — | 0.6 | Ni 4 | Co 4 | Pd 0.01 | — | — | — | | 45 | " | " | 525 |
| Catalyst 8 | 10 | 16 | 9.0 | 3.0 | 1.5 | 0.6 | Ni 6 | Zn 0.5 | — | — | — | — | | 45 | " | " | 530 |
| Catalyst 9 | 10 | 10 | 8.5 | 1.0 | — | 0.05 | Ni 5.5 | | Ti 3.0 Zr 0.5 | — | — | P 0.75 | | 45 | 600 | " | 610 |
| Catalyst 10 | 10 | 10 | 8.5 | 1.0 | — | 1.5 | Cu 0.5 | Ni 5 | Nb 0.5 | — | Na 0.25 | — | | 45 | 580 | " | 475 |
| Catalyst 11 | 10 | 10 | 8.5 | 1.5 | — | 0.2 | Ni 5.0 | | — | — | — | — | | 70 | 600 | " | 611 |
| Catalyst 12 | 10 | 15 | 9.0 | 1.0 | — | 0.5 | Ni 5.5 | | — | — | Rb 0.05 | — | | 45 | " | " | 303 |
| Catalyst 13 | 10 | 10 | 9.0 | 2.0 | — | 0.6 | Ni 5.5 | | — | W 0.3 | — | B 0.75 | P 0.75 | 70 | " | " | 625 |
| Catalyst 14 | 10 | 10 | 8 | 2.5 | — | 0.1 | — | | — | W 0.25 | — | P 1.0 | | 45 | " | " | 650 |

| Catalyst No. | Active Test Condition | | Results of Active Test | | |
|---|---|---|---|---|---|
| | Reaction Temp. (°C.) | Contact Time (sec) | Yield of Acrylonitrile (%) | Conversion of Propylene (%) | Selectivity of Acrylonitrile (%) |
| Catalyst 1 | 415 | 3.75 | 85.2 | 98.1 | 85.8 |
| Catalyst 2 | " | 3.0 | 88.0 | 99.1 | 88.8 |
| Catalyst 3 | " | 3.0 | 85.5 | 99.0 | 86.4 |
| Catalyst 4 | " | 3.0 | 86.0 | 98.8 | 88.9 |
| Catalyst 5 | " | 3.5 | 84.7 | 98.3 | 86.2 |
| Catalyst 6 | " | 3.0 | 84.8 | 99.2 | 85.4 |
| Catalyst 7 | " | 3.0 | 86.5 | 98.9 | 87.5 |
| Catalyst 8 | " | 3.5 | 87.5 | 99.4 | 88.0 |
| Catalyst 9 | " | 3.25 | 84.5 | 98.0 | 86.2 |
| Catalyst 10 | " | 3.25 | 85.5 | 99.1 | 86.3 |
| Catalyst 11 | " | 3.5 | 87.9 | 99.0 | 88.7 |
| Catalyst 12 | " | 3.5 | 87.2 | 99.0 | 88.0 |
| Catalyst 13 | " | 3.5 | 88.3 | 99.6 | 88.7 |
| Catalyst 14 | 430 | 4.0 | 84.0 | 98.5 | 85.3 |

TABLE 2

| Catalyst No. | Fe | Sb | Mo | L Bi | L Te | K | M | | N | Q | R | T | | SiO₂ | Temp. (°C.) | Time (hr) | Size of Iron Antimonate Crystallite (Å) |
|---|---|---|---|---|---|---|---|---|---|---|---|---|---|---|---|---|---|
| Comparative Catalyst 1-1 | 10 | 10 | 8.5 | 1.5 | — | 0.2 | Ni 5.0 | | — | — | — | B 0.75 | P 0.55 | 45 | 530 | 3 | — |
| Comparative Catalyst 1-2 | 10 | 10 | 8.5 | 1.5 | — | 0.2 | Ni 5.0 | | — | — | — | B 0.75 | P 0.55 | 45 | 530 | " | 70 |
| Comparative Catalyst 2 | 10 | 4 | 8.5 | 1.5 | — | 0.2 | Ni 5.0 | | — | — | — | B 0.75 | P 0.55 | 45 | 580 | " | 596 |
| Comparative Catalyst 3 | 10 | 70 | 8.5 | 1.5 | 3 | 0.2 | Ni 5.5 | | — | W 0.5 | — | B 1.0 | | 60 | 580 | " | 513 |
| Comparative Catalyst 4 | 10 | 10 | 3 | 1.5 | — | 0.4 | Cr 0.3 Mn 0.3 | Co 3 | — | — | Cs 0.05 | — | | 60 | 580 | " | 364 |
| Comparative Catalyst 5 | 10 | 10 | 40 | 1.5 | — | 0.4 | La 0.05 | Ni 6 | — | V 0.05 | Li 0.2 | — | | 60 | 560 | " | 513 |
| Comparative Catalyst 6 | 10 | 16 | 9.0 | — | — | 0.6 | Ni 4 | Co 4 | Pd 0.01 | — | — | — | | 45 | 560 | " | 525 |
| Comparative Catalyst 7 | 10 | 16 | 9.0 | 6 | 6 | 0.6 | Ni 6 | Zn 0.5 | — | — | — | — | | 45 | 580 | " | 595 |
| Comparative Catalyst 8 | 10 | 10 | 8.5 | 1.0 | — | — | Ni 5.5 | | Ti 3 Zr 0.5 | — | — | P 0.75 | | 45 | 600 | " | 610 |

TABLE 2-continued

| | | | | | | | | | | | | | | | | | |
|---|---|---|---|---|---|---|---|---|---|---|---|---|---|---|---|---|---|
| Comparative Catalyst 9 | 10 | 10 | 8.5 | 1.5 | — | — | Ni 5 | — | — | Na 0.2 | B 0.75 | P 0.55 | 45 | 580 | " | 596 |
| Comparative Catalyst 10 | 10 | 10 | 8.5 | 1.0 | — | — | Cu 0.5 | Ni 5 | Nb 0.5 | — | Na 1.75 | — | 45 | 580 | " | 495 |
| Comparative Catalyst 11 | 10 | 10 | 8.5 | 1.0 | — | 6.0 | Cu 0.5 | Ni 5 | Nb 0.5 | — | Na 0.25 | — | 45 | 580 | " | 398 |
| Comparative Catalyst 12 | 0.33 | 1 | 1 | 1 | — | — | — | — | — | — | — | — | 6.0 | 550 | 1 | 326 |
| Comparative Catalyst 13 | 11 | 18 | 10 | 0.04 | 0.03 | — | Co 5 | — | — | — | — | — | 45 | 600 | 5 | 258 |
| Comparative Catalyst 14 | 10 | 25 | 1.2 | — | 3 | — | Co 4 | — | W 0.25 | — | B 1 | — | 60 | 700 | 4 | 75 |

| Catalyst No. | Active Test Condition | | Results of Active Test | | |
|---|---|---|---|---|---|
| | Reaction Temp. (°C) | Contact Time (sec) | Yield of Acrylonitrile (%) | Conversion of Propylene (%) | Selectivity of Acrylonitrile (%) |
| Comparative Catalyst 1-1 | 415 | 3.0 | 55.7 | 85.1 | 65.5 |
| Comparative Catalyst 1-2 | 415 | 3.0 | 57.0 | 86.1 | 66.2 |
| Comparative Catalyst 2 | 415 | 3.0 | 80.7 | 98.6 | 81.8 |
| Comparative Catalyst 3 | 415 | 3.0 | 82.5 | 97.5 | 84.6 |
| Comparative Catalyst 4 | 420 | 3.0 | 47.4 | 72.2 | 65.6 |
| Comparative Catalyst 5 | 415 | 3.0 | 71.5 | 96.5 | 74.1 |
| Comparative Catalyst 6 | 415 | 4.0 | 32.8 | 73.1 | 46.2 |
| Comparative Catalyst 7 | 420 | 4.0 | 73.5 | 93.0 | 79.0 |
| Comparative Catalyst 8 | 415 | 3.25 | 79.4 | 98.6 | 80.5 |
| Comparative Catalyst 9 | 415 | 3.0 | 82.5 | 98.2 | 84.0 |
| Comparative Catalyst 10 | 415 | 3.25 | 79.6 | 97.5 | 81.6 |
| Comparative Catalyst 11 | 415 | 3.5 | 75.2 | 96.5 | 77.9 |
| Comparative Catalyst 12 | 470 | 4.5 | 74.3 | 95.6 | 77.7 |
| Comparative Catalyst 13 | 390 | 6.0 | 78.6 | 97.2 | 80.8 |
| Comparative Catalyst 14 | 430 | 4.0 | 82.8 | 97.1 | 85.3 |

TABLE 3

| Catalyst No. | Reaction | Activity Test Condition | | Yield of Desired Product | | Conversion of Starting Compound | | Selectivity of Desired Product | |
|---|---|---|---|---|---|---|---|---|---|
| | | Reaction Temperature (°C) | Contact Time (sec) | Desired Product | Yield (%) | Compound | Conversion (%) | Desired Product | Selectivity (%) |
| Catalyst 2 | Oxidation of propylene | 330 | 3.0 | Acrolein Acrylic acid | 84.1 5.9 | Propylene | 97.0 | Acrolein + acrylic acid | 92.7 |
| Catalyst 3 | Ammoxidation of methanol | 420 | 0.75 | Prussic acid | 85.3 | Methanol | 99.5 | Prussic acid | 85.7 |
| Catalyst 6 | Oxidation of methanol | 350 | 1.5 | Formaldehyde | 80.1 | Methanol | 99.1 | Formaldehyde | 80.8 |
| Catalyst 10 | Ammoxidation of tert-butanol | 420 | 2.0 | Methacrylonitrile | 76.7 | tert-Butanol | 100 | Methacrylonitrile | 76.7 |
| Catalyst 13 | Oxidation of tert-butanol | 360 | 3.0 | Methacrolein Methacrylic acid | 75.3 3.4 | tert-Butanol | 100 | Methacrolein + methacrylic acid | 78.7 |

It is apparent from Tables 1 and 2 that the catalysts 1 to 14 of the present invention are superior in performance to comparative catalysts 1-1 to 14.

Comparative catalysts 1-1 and 1-2 had the same composition as that of the catalyst of the present invention, but these catalysts are outside the scope of the present invention, because either the presence of crystalline iron antimonate is not found, or the size of iron antimonate is smaller than that of the present invention.

Comparative catalysts 2 to 7 and 11 show the embodiments wherein the ratio of the Sb component, the Mo component or the L component is outside the scope of the present invention. The yields are reduced when these catalysts are used.

Comparative catalysts 8 to 10 show the embodiments wherein the K component is omitted or the Na component is used in place of the K component. The yields are reduced by about 4 or 5% when these catalysts are used.

Comparative catalyst 12 (catalyst of Example 9 of JP-A-56-97550), comparative catalysts 13 (catalyst of Example 8 of JP-A-57-114560) and comparative catalyst 14 (catalyst 12 of JP-B-53-18014) show the embodiments wherein the K component is omitted, and these catalysts are prepared for the purpose of comparison with the catalysts of the present invention.

Further, it is apparent that the catalysts of the present invention give good results in the oxidation of propylene, in the oxidation or ammoxidation of methanol and in the oxidation or ammoxidation of tertbutanol (see, Table 3) in addition to the ammoxidation of propylene.

While the invention has been described in detail and with reference to specific embodiments thereof, it will be apparent to one skilled in the art that various changes and modifications can be made therein without departing from the spirit and scope thereof.

What is claimed is:

1. An iron-antimony-molybdenum-containing oxide catalyst composition for oxidation reactions, comprising a crystalline iron antimonate having a crystallite size of 100 Å or more, said catalyst being represented by the following empirical formula:

$$Fe_aSb_bMo_cL_dK_eM_mN_nQ_qR_rT_tO_x$$

wherein L represents at least one element selected from the group consisting of Bi and Te; M represents at least one element selected from the group consisting of Cu, Mg, Zn, La, Ce, Al, Cr, Mn, Co, Ni and Sn; N represents at least one element selected from the group consisting of Be, Ca, Sr, Ba, Y, Pr, Nd, Th, U, Ti, Zr, Hf, Nb, Ta, Re, Ru, Os, Rh, Ir, Pd, Pt, Ag, Au, Cd, Al, Ga, In, Ge and Pb; Q represents at least one element selected from the group consisting of V and W; R represents at least one element selected from the group consisting of Li, Na, Rb, Cs and Tl; T represents at least one element selected from the group consisting of B, P, As and Se; a, b, c, d, e, m, n, q, r, t and x each is an atomic ratio, wherein when a is 10, b is 5 to 60, c is 5 to 30, d is 0.01 to 10, e is 0.01 to 5, m is 0 to 30, n is 0 to 10, q is 0 to 5, r is 0 to 3, t is 0 to 5, and x is a number of oxygen atoms as determined corresponding to the oxides formed by combining the above mentioned components.

2. The catalyst composition as claimed in claim 1, wherein the crystallite size of iron antimonate in the catalyst is not smaller than 200 Å.

3. The catalyst composition as claimed in claim 1, wherein M represents at least one element selected from the group consisting of Mg, Zn, Ce, Cr, Mn, Co and Ni; N represents at least one element selected from the group consisting of Ti, Zr, Nb, Pd, Ag, Ge and Pb; R represents at least one element selected from the group consisting of Li, Na and Cs; and T represents B and/or P.

4. The catalyst composition as claimed in claim 1, wherein the ratio of the components in the catalyst composition is such that when a is 10, b is 6 to 30, c is 6 to 20, d is 0.1 to 8, e is 0.02 to 2, m is 0 to 20, n is 0 to 5, q is 0 to 4, r is 0 to 2.5 and t is 0 to 4.

5. The catalyst composition as claimed in claim 1, wherein the atomic ratio of P/Fe is not higher than 0.3 when P is employed as T component.

6. The catalyst composition as claimed in claim 1, wherein said oxide catalyst is supported on a carrier.

7. A process for preparing an iron-antimony-molybdenum-containing oxide catalyst composition for oxidation reactions, comprising a crystalline iron antimonate having a crystallite size of 100 Å or more, said catalyst being represented by the following empirical formula:

$$Fe_aSb_bMo_cL_dK_eM_mN_nQ_qR_rT_tO_x$$

wherein L represents at least one element selected from the group consisting of Bi and Te; M represents at least one element selected from the group consisting of Cu, Mg, Zn, La, Ce, Al, Cr, Mn, Co, Ni and Sn; N represents at least one element selected from the group consisting of Be, Ca, Sr, Ba, Y, Pr, Nd, Th, U, Ti, Zr, Hf, Nb, Ta, Re, Ru, Os, Rh, Ir, Pd, Pt, Ag, Au, Cd, Al, Ga, In, Ge and Pb; Q represents at least one element selected from the group consisting of V and W; R represents at least one element selected from the group consisting of Li, Na, Rb, Cs and Tl; T represents at least one element selected from the group consisting of B, P, As and Se; a, b, c, d, e, m, n, q, r, t and x each is an atomic ratio, wherein when a is 10, b is 5 to 60, c is 5 to 30, d is 0.01 to 10, e is 0.01 to 5, m is 0 to 30, n is 0 to 10, q is 0 to 5, r is 0 to 3, t is 0 to 5, and x is a number of oxygen atoms as determined corresponding to the oxides formed by combining the above mentioned components, which comprises preparing an aqueous slurry containing (i) iron antimonate, (ii) molybdenum, (iii) at least one element selected from the group consisting of bismuth and tellurium, and (iv) potassium as principal components or an aqueous slurry containing said principal components [(i), (ii), (iii) and (iv)] and (v) at least one element selected from the group consisting of catalytic components represented by M, N, Q, R and T in the above described empirical formula; drying said aqueous slurry; and calcining the dried product.

8. The process as claimed in claim 7, wherein said aqueous slurry contains a raw material for the carrier component.

9. The process as claimed in claim 7, wherein the pH of said aqueous slurry is adjusted to not higher than 5.

10. The process as claimed in claim 7, wherein the pH of said aqueous slurry is adjusted to not lower than 7.

11. The process as claimed in claim 7, wherein the pH of said aqueous slurry is adjusted to not lower than 6 and said aqueous slurry contains a chelating agent.

12. The process as claimed in claim 7, wherein the pH of said aqueous slurry is adjusted to not lower than 6 and said aqueous slurry contains a chelating agent and an iron compound.

* * * * *